Patented Apr. 4, 1950

2,502,436

UNITED STATES PATENT OFFICE 2,502,436

4-AMINO-3-PENTADECYL PHENOL

Charles R. Dawson, New York, and David Wasserman, Brooklyn, N. Y., assignors, by mesne assignments, to The Harvel Corporation, a corporation of New Jersey No Drawing. Application July 31, 1946, Serial No. 687,524

1 Claim. (Cl. 260—575)

This invention relates to novel compounds and to methods as well as steps in the methods for producing the same. More particularly, this invention relates to derivatives of 3-pentadecyl phenol and to methods and steps in the methods for producing them. In one of its more specific aspects, the invention is directed to novel azo compounds as well as amino derivatives of 3-pentadecyl phenol and to the methods and steps in the methods for producing them.

Prior to this time we discovered that the 4-amino-3-pentadecyl phenol could be produced. The methods for producing said compound are fully described in our copending patent application Ser. No. 586,040, filed March 31, 1945, of which this application is a continuation in part, and which application is hereby made part hereof. As set forth in said application 3-pentadecyl phenol is first subjected to direct nitration whereupon there is produced a mixture of 4-nitro-3-pentadecyl phenol and 6-nitro-3-pentadecyl phenol. These isomers may be separated from each other by fractional crystallization and may then be subjected to catalytic reduction for the production of the corresponding amino compounds. The pure amino-pentadecyl-phenols prepared by this procedure were obtained in over-all yields of only 10%–20%. Besides being characterized by (1) the production of a mixture of both the 4 and 6 compounds, and (2) being a rather slow and time consuming process, the above procedure has not been entirely satisfactory for the production of the 4-amino-3-pentadecyl phenol because of the low yield of this compound.

It was primarily to minimize the aforesaid disadvantages that the present invention has been made. We have discovered that high yields of 4-amino-3-pentadecyl phenol in high degree of purity may be obtained by first employing a coupling reaction of a diazotized primary aromatic amine with 3-pentadecyl phenol to produce a novel azo compound and then reductively cleaving the resultant novel compound.

While this coupling may be accomplished either under weakly acid, neutral or weakly alkaline conditions for the production of novel azo compounds, we prefer to carry out this step under alkaline conditions, and when carried out under alkaline conditions, any suitable inorganic or organic alkaline reagent may be employed. The reductive cleaving of the novel azo compounds or dyes may be carried out by employing any suitable chemical reducing agent or by catalytic hydrogenation. Among some of said reducing agents are sodium hydrosulfite (zinc and hydrochloric acid), stannous chloride, etc. Among some of the catalysts which may be employed when catalytic hydrogenation is used are Raney nickel and palladium.

When the coupling is carried out in a medium made weakly alkaline by a metal hydroxide and then the resultant azo compound is reductively cleaved, there is produced 4-amino-3-pentadecyl phenol or salts thereof depending upon the pH of the system at the end of the reductive cleavage because 4-amino-3-pentadecyl phenol is an amphoteric substance and exists in acid solutions as a salt involving the amino group (amine salts) and exists in alkaline solutions as a salt involving the phenolic hydroxy group (phenolates). If the pH of the system after reductive cleavage is alkaline, amino phenolates are produced which may be converted into the free amino-phenols by subsequent addition of one equivalent of strong acid. If the pH of the system after reductive cleavage is acid, then amine salts are produced which may be converted into the free amino-phenols by the subsequent addition of one equivalent of alkali. When the reductive cleavage is carried out under neutral conditions such as with catalytic hydrogenation, the resultant product is the free amino-phenol. Any of said amino-phenols may be converted to the amine salts by treating the same with an acid, examples of which are hydrochloric, sulphuric and phosphoric. If more than one equivalent of alkali is used in the treatment of the acid salt of the amino-phenol, it will be converted to the amino-phenolate. Thus by employing various sets of conditions and procedures, there may be produced a 4-amino derivative of 3-pentadecyl phenol which derivative may be free 4-amino-3-pentadecyl phenol, a 4-amino-3-pentadecyl phenolate or an acid salt of 4-amino-3-pentadecyl phenol. Any diazotized aromatic primary amine may be employed in carrying out this invention and the following compounds when diazotized are examples thereof: aniline, sulfanilic acid, ortho, meta and para toluidine, dianisidine, nitroaniline, toluidine, anisidine, phenyldiamine, chloro, bromo and iodo aniline, α- and β-naphthylamine and naphthylamine sulfonic acid.

The 3-pentadecyl phenol having the following formula

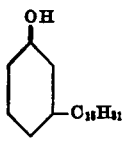

may be readily obtained by hydrogenating only the unsaturated side chain of cardanol or by hydrogenating cashew nut shell liquid and then separating this compound from the other components of the hydrogenated cashew nut shell liquid. The manner for the production of this compound is disclosed in our hereintofor identified application and also in the patent to S. Caplan No. 2,181,119, issued on the 28th day of November, 1939.

The following examples are given merely by way of illustrating the manner of producing 4-amino- derivatives of 3-pentadecyl phenol and are not to be construed in a limiting sense.

*Example 1*

A mixture of 52.5 grams of sulfanilic acid dihydrate and 14 grams of potassium hydroxide in 200 cc. of water was cooled to 15° C. Meanwhile, a solution of 18.5 grams of sodium nitrite in 50 cc. of water was prepared and then added to the first solution. The resultant mass was poured rapidly into 53 cc. of concentrated hydrochloric acid and 250 grams of ice in an ice-salt water bath, stirring vigorously at all times to keep the temperature at 0° C.-5° C. The resulting mixture containing diazotized sulfanilic acid

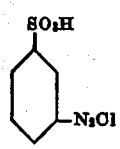

was stirred at 0° C. for about 15 to 20 minutes while preparing the next solution.

A solution of 75 grams of 3-pentadecyl phenol dissolved in 39 grams of potassium hydroxide in 500 cc. of 95% ethanol was placed in a 3 liter 3-neck flask and cooled to 0° C.-5° C. by means of ice-salt water bath. The aforesaid mixture containing the diazotized sulfanilic acid was filtered wet, and the diazotized sulfanilic acid was then resuspended in ethanol at 0° C. and subsequently this suspension was slowly added to said alcoholic alkaline solution of the 3-pentadecyl phenol at 0° C. whereupon coupling of the diazotized sulfanilic acid with said 3-pentadecyl phenol took place resulting in the production of a novel red azo dye solution. The red solution containing the resultant azo compound was stirred for 2 hours at 10° C. and then was reductively cleaved to produce a 4-amino derivative of said phenol. Half of the red solution, which might serve as a dye solution, was reduced by adding a saturated solution containing 57 grams of technical sodium hydrosulfite at 45° C.-75° C. in a continuous stream, while the dye solution was maintained in the state of boiling under a reflux condenser. After all of the hydrosulfites was added, the mixture was maintained in this state of boiling for a period of about 15 minutes, the deep red solution turned pale tan indicating complete reduction. Then a solution of 20 grams of acetic acid in 150 cc. of water was added at reflux temperature and the flask was then cooled to 0° C., whereupon the 4-amino 3-pentadecyl phenol precipitated out and the fine particles thereof coagulated. This solid precipitate was filtered and vacuum dried. It weighed 40 grams (quantitative yield) and melted at 93° C.-97° C.

Upon one recrystallization from a petroleum fraction boiling at 90° C.-110° C., saturated paraffins, or heptane, the melting point went up to 104° C.-106° C. and so obtained at 75%-80% yield. A mixed melting point with a known sample of 4-amino 3-pentadecyl phenol resulted in no depression of the melting point. The filtrate from the reduction mixture was distilled to recover ethanol and acetic acid which were separated from each other and there was left behind a residue of sulfanilic acid which was used for diazotization and coupled once again without further purification.

The reaction proceeds as follows:

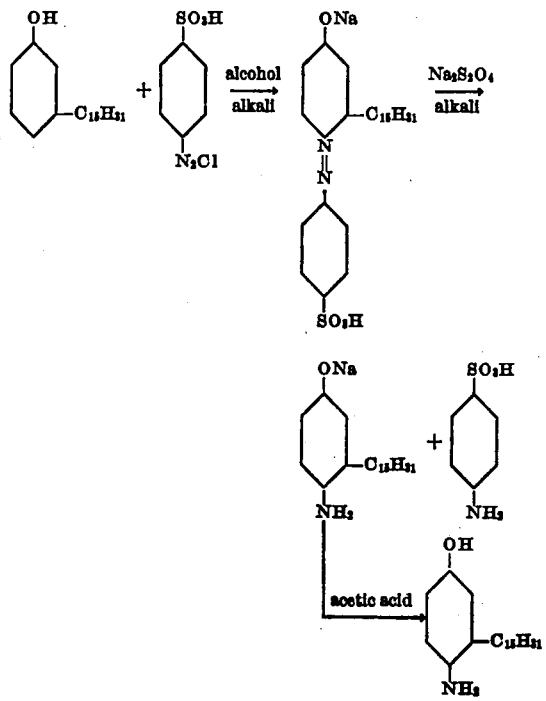

*Example 2*

In a liter 3-neck flask was placed 84.5 grams of 3-penta decyl phenol and 48.6 grams of potassium hydroxide in 200 cc. of 95% ethanol.

The diazonium solution was prepared by placing 25.6 grams of aniline, 74.4 grams of concentrated hydrochloric acid, enough water to dissolve the hydrochloride, and 150 cc. of ethanol in a 1-liter beaker. A concentrated solution of 20 grams of sodium nitrite in 100 cc. of 50% ethanol, at 0° C. was added below the surface of the amine solution, keeping the temperature below 0° C. by means of an ice-salt bath. The nitrite was added until a positive test with starch iodide test paper was indicated.

To the alkaline solution of the phenol in the flask was added the alcoholic benzene diazonium chloride solution at 0° C.-10° C. below the surface of the first solution, with efficient stirring for one-half hour to produce a novel azo dye. After stirring for two hours the solution was made strongly alkaline by adding 50 grams of potassium hydroxide dissolved in 150 cc. of ethanol.

To the deep red solution of the novel azo dye was added 110 grams of solid sodium hydrosulfite in small portions at reflux temperature. After each addition the alkalinity was checked with litmus paper, and more KOH was added if necessary to maintain strong alkalinity. The solution should turn neutral on the last addition of hydrosulfite. At the end of one-half hour the solution turned pale yellow indicating completion of the reaction. The hot alcoholic solutions was filtered from the salts precipitated during the reaction and they were washed with more hot alcohol. The alcoholic filtrate and washings were then combined for recovery of the desired products. Three methods of recovery were employed.

Recovery as free amino phenol (steam distillation)

A portion (¼) of the alcoholic solution or filtrate was made alkaline with alcoholic potassium hydroxide. The alcohol was then distilled off (up to 85° C.) and saved, and the residue was steam distilled to recover the aniline. The residual oil of crude aminophenol turned dark brown and solidified on cooling. The steam distillate was homogeneous because of the large volume of water, but the presence of aniline was detectable by the diazotization and coupling reaction with β-naphthol as hereinafter described. The dark brown residue of crude amino phenol was filtered, vacuum dried and weighed 25 grams (theory 25 grams). It was a material that appeared to contain considerable impurity. A 21.6 gram sample after recrystallization from textile spirits yielded 13.42 (62%) of the free aminophenol as light brown needles melting at 99° C.–101° C.

Recovery as free aminophenol

Because of the solubility of aniline in water (about 3% at room temperature) and greater solubility in dilute alcohol solution it was found possible to separate the aniline from the crude insoluble aminophenol without the necessity of steam distillation. A second portion (¼) of the alcoholic solution was treated with 20 grams of acetic acid in 200 cc. of water, heated to the boiling point and cooled whereupon precipitation occurred. The presence of acetic acid helped coagulate the precipitate which facilitated filtration. The suspension was filtered through diatomaceous earth at 0° C. to yield a light brown solid in theoretical yield, melting at 95° C.–97° C. After one recrystallization from heptane pale tan needles or plates in 50% yield, melting at 99° C.–101° C. were obtained. The aniline can be recovered from the original filtrate by adding concentrated HCl and distilling off the residual solvents.

Conversion to and recovery as aminophenyl hydrochloride

A third portion (¼) of the alcoholic solution or filtrate was made strongly acid with dilute hydrochloric acid, and poured with stirring into two liters of ice water. The hydrochloride of the aminophenol separated as a tan solid leaving aniline hydrochloride in solution. The solid material was filtered off, sucked dry and then vacuum dried. 25 grams of solid (theory 25 grams) was obtained, that was light brown in color. The product was further purified in two ways.

(a) 10 grams of the crude amino phenol hydrochloride was dissolved in ethanol, treated with 3 grams of carbon black and filtered into ice water. The gray solid was filtered off, dried, and weighed after vacuum drying. Yield was 4.3 grams (43%) due to solution of some of the hydrochloride in ethanol water. Further purification by suspension in ether and filtration did not change the weight but produced a lighter colored product.

(b) 9 grams of the crude hydrochloride was purified by suspending the material in ether. The ether dissolves the impurities and leaves the hydrochloride salt in the form of pale tan needles. Yield 5.0 grams (55.5%).

The aniline hydrochloride that remained in the water-alcohol filtrate, after separating the crude amino phenol hydrochloride by precipitation with ice water was recovered by simply distilling off the alcohol. The alcohol that distills off up to 95° C. may be reused as solvent in the coupling reaction, and the mother liquor of aniline hydrochloride may be concentrated and should be useable again in the coupling reaction. The presence of aniline hydrochloride in this mother liquor was detected by diazotization of a small portion and coupling with an alkaline solution of β-naphthol.

Reductive cleavage by hydrogenation may be affected by shaking in an atmosphere of hydrogen a suspension of either Raney nickel or palladium powder catalyst in a red azo dye solution of Examples 1 and 2.

The free 4-amino-3-pentadecyl phenol in its pure condition is a white crystalline solid melting at 105° C.–106° C., is soluble in ether, ethyl acetate, dioxane, acetone and hot alcohol, is insoluble in petroleum ether and water and changes color on exposure to air.

The 4-amino derivatives of 3-pentadecyl phenol are useful as antioxidants generally and are especially useful in quick drying paints, lubricating oils, cutting oils, aldehydes, divinyl ether anesthetics, gasoline, and the compounding of natural rubber, rubbery polymers of butadiene, rubbery copolymers of butadiene and acrylonitrile and rubbery copolymers of butadiene and styrene. They are also useful as photographic developers, and may be employed as intermediates for the preparation of a wide variety of novel and useful compounds.

The following examples are given merely by way of illustrating the manner of using 4-amino-3-pentadecyl phenol as a synthetic intermediate and are not to be construed in a limiting sense.

The free 4-amino-3-pentadecyl phenol may be diazotized to provide the diazonium salt which in turn may be converted (1) to 1,4 hydroxy-3-pentadecyl benzene by treating the salt with 80% sulphuric acid, (2) to 4-cyano-3-pentadecyl phenol by treatment of the salt with cuprous cyanide which cyano compound may be hydrolized to produce 4-carboxyl-3-pentadecyl phenol, (3) to dyes by coupling with dye intermediates such as H, J and K acids; or the diazonium salt may be reacted with potassium cyanate in glacial acetic acid for the production of substituted ureas. The 4-amino-3-pentadecyl phenol may be reacted (1) with various aldehydes and ketones in the presence of an acid catalyst to produce resins, (2) with alkyl dihalides under alkaline conditions for the production of long chain ether, amine polymers and with trihalides for the production of thermosetting cross polymers.

Since certain changes may be made in carrying out the process and certain modifications in the compositions which embody the invention may be made without departing from its scope, it is intended that all matter contained in the description shall be interpreted as illustrative and not in a limiting sense.

Having thus described our invention, what we claim and desire to protect by Letters Patent is:

A novel compound

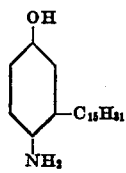

said compound being a solid at room temperature and whose melting point is 105° C.–106° C.

CHARLES R. DAWSON.
DAVID WASSERMAN.

REFERENCES CITED

The following references are of record in the file of this patent:

UNITED STATES PATENTS

| Number | Name | Date |
|---|---|---|
| 1,890,430 | Perkins et al. | Dec. 2, 1932 |
| 2,118,494 | Coffey et al. | May 24, 1938 |
| 2,127,478 | Crossley et al. | Aug. 16, 1938 |
| 2,207,727 | Galloway | July 16, 1940 |
| 2,266,413 | Crossley et al. | Dec. 16, 1941 |

OTHER REFERENCES

Stevens et al., J. Am. Chem. Soc., vol. 63, pp. 308–311 (1941).